Patented June 5, 1928.

1,672,615

UNITED STATES PATENT OFFICE.

MORRIS SELIG KHARASCH, OF COLLEGE PARK, MARYLAND.

ALKYL MERCURIC SULPHUR COMPOUND AND PROCESS OF PRODUCING IT.

No Drawing.   Application filed June 29, 1927.  Serial No. 202,468.

The present invention relates to alkyl mercuric compounds which either are themselves water-soluble or have water-soluble salts, or both, and in which the mercury is bonded by one bond to a carbon atom of an alkyl radical; and to the process of producing such alkyl mercuric compounds.

More specifically, the alkyl mercuric compounds which are produced by my invention have the mercury atom bonded by one bond to a carbon atom of an alkyl radical R, have the mercury atom bonded by its remaining bond to a sulphur atom, and have the sulphur atom bonded to a carbon atom of an organic radical $R_{Ac}$ containing an acid group which has a free valence bond capable of being attached either to hydrogen or to a metal. The organic radical bonded to the sulphur may be either aromatic or aliphatic. The organic radical R which the present invention contemplates as being bonded directly to the mercury may be such radicals as the methyl radical $CH_3—$, the ethyl radical $C_2H_5—$, the propyl radical $C_3H_7—$, the butyl radical $C_4H_9—$, the amyl radical $C_5H_{11}—$, etc., or their isomers, or unsaturated aliphatic hydrocarbon radicals such as the allyl group $CH_2=CH-CH_2—$; but I prefer the lower hydrocarbons of this general alkyl class, and especially those having not to exceed three carbon atoms, and desirably those which have less than three carbon atoms such as the methyl and ethyl groups.

The final products contemplated by the present invention would thus have the following typical formula:

(1) 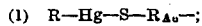 $R—Hg—S—R_{Ac}—$;

in which R is an alkyl radical, and $R_{Ac}$ is an organic radical containing an acid group which has a free valence bond capable of being attached either to hydrogen to form the corresponding acid or to a metal to form a salt of such acid, and in which both the radical R and the radical $R_{Ac}$ have carbon atoms bonded directly to the mercury atom and to the sulphur atom respectively. Preferably the radical R has not to exceed three carbon atoms; and it is desirably of the paraffin series. The radical $R_{Ac}$ is desirably an aromatic radical. Some of my more specific claims are directed to water-soluble salts containing the above radical; but the broader claims cover both the acids and their salts.

In my Patent No. 1,589,599, granted June 22, 1926, I describe a general method whereby organo-metallic compounds can be introduced into water solution by the use of acids containing sulfhydryl groups; which includes thioglycollic acid, the various sulfhydryl butyric acids, the various sulfhydryl propionic acids, thiomalic acid, thiosalicylic acid, p-sulfhydryl benzene sulfonic acid, mercapto-benzothiazole carboxylic acid, p-sulfhydryl phenyl acetic acid, cysteine, and substitution products of such acids, as well as other compounds containing a sulfhydryl (—SH) group or groups and an acidic group or groups such as the carboxylic group (—COOH) or the sulfonic group (—$SO_3H$). That patent, although including claims covering generically certain water-soluble organo-mercuric compounds and the process of producing them, whether the organic radical directly attached to the mercury was aromatic or aliphatic, was directed in its more specific claims to mercury compounds in which such organic radical directly attached to the mercury atom was an aromatic radical, such as the phenyl radical; so that claims directed specifically to such mercuric compounds when the organic radical directly attached to the mercury atom was an alkyl radical could not be obtained therein. This present application, on the other hand, is directed specifically to such organo-mercuric compounds in which the organic radical directly attached to the mercury atom is an alkyl radical; and contemplates generally such organo-metallic compounds when the mercury is attached to sulphur and the sulphur is attached to an acid group of the general types mentioned above.

In producing these new products, I treat a suitable alkyl mercuric compound with a suitable sulfhydryl organic acid or its salt, desirably using the sulfhydryl organic acid. This may be expressed by the following general formula:

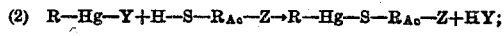

(2) R—Hg—Y+H—S—R$_{Ac}$—Z→R—Hg—S—R$_{Ac}$—Z+HY;

in which R is an alkyl radical having a carbon atom directly bonded to Hg, R$_{Ac}$ is an organic radical having a carbon atom directly bonded to S and containing an acid group which has a free valence bond capable of being attached either to hydrogen to form the corresponding acid or to a metal to form a salt of such acid, Y is an inorganic radical of other than the sulphur family (such for instance as —Cl or —OH) or an organic-acid radical (such as the acetoxy radical —OCOCH$_3$), and Z represents either hydrogen or a monovalent metal or an equivalent polyvalent metal or a monovalent non-metal basic radical. In the reaction, I prefer that Z shall be hydrogen, so that the initial sulfhydryl organic compound will be an acid. In carrying out the reaction, I prefer to prevent the formation in the final result of any free by-product acid, (and if desired of any acid,) for which purpose it is desirable either that Y be the hydroxyl group —OH or that a base be provided as a third reacting compound, as for instance by using one or two (or more) molecular equivalents of sodium hydroxide or sodium bicarbonate; or Z may be a monovalent metal or basic radical.

While many other examples of my invention might be given, I give below a few examples of products involving the present invention and the methods of preparing such products.

In carrying out the present invention, I prefer to carry on the condensation with acohol rather than with water as the condensing medium or solvent; although in many instances 1 desirably use water and alcohol together, and although my invention broadly contemplates the use of any suitable condensing medium or solvent, such as water, alcohol, or acetone. My invention contemplates the use of either the sulfhydryl acids or their salts as the initial sulfhydryl compounds used in the process.

The following examples are merely illustrative of my invention:

*Example 1.*

To a solution or suspension in alcohol of 0.1 mole of methyl mercuric chloride (CH$_3$HgCl) there is added 0.1 mole of sodium hydroxide (NaOH) in water and 0.1 mole of thiosalicylic acid (HS—C$_6$H$_4$—COOH) in alcohol. The condensation takes place in this manner:

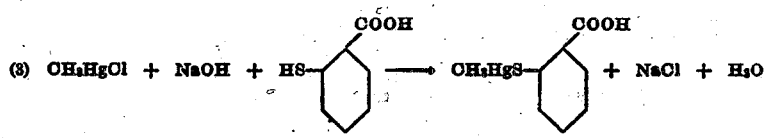

(3) CH$_3$HgCl + NaOH + HS—⌬—COOH ⟶ CH$_3$HgS—⌬—COOH + NaCl + H$_2$O

The product is poured into water, whereupon the methyl mercuri-thiosalicylic acid is precipitated, since it is insoluble in water. This precipitate can be collected on a filter, and washed well with water to remove all the alcohol, salts, and free inorganic acids. The washed precipitate may then be dissolved in a water solution of sodium hydroxide, or, better, in a water solution of sodium bicarbonate. This produces the water-soluble salt

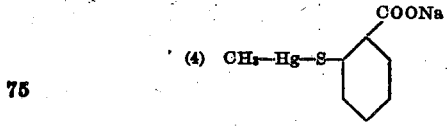

(4) CH$_3$—Hg—S—⌬—COONa

The methyl mercuri-thiosalicylic acid is a white solid which melts at about 171° C. It is soluble in alcohol and in ether. It is soluble in either sodium bicarbonate or sodium hydroxide solution, to form the corresponding salt; which is suitable for intravenous injection.

The alkali metal salts, such as the sodium and potassium salts, of this acid, are readily soluble in water; so are its ammonium salts, and many (probably all) of its alkyl-ammonium salts; but the alkaline earth salts, such as the calcium salt, are insoluble in water.

*Example 2.*

If desired, the water-soluble salts mentioned above may be prepared directly, by a process similar to that outlined in Example 1, save that two or more molecular proportions of sodium hydroxide are used instead of one. In that case, the reaction will be as follows:

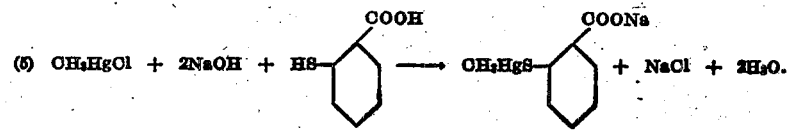

(5) CH$_3$HgCl + 2NaOH + HS—⌬—COOH ⟶ CH$_3$HgS—⌬—COONa + NaCl + 2H$_2$O.

To isolate the sodium methyl mercuri-thiosalicylate in a form in which it will be suitable for injection, the whole mixture is poured into an excess of water, filtered if necessary and the filtrate acidified with either sulphuric or hydrochloric acid. With sulphuric acid, the following reaction takes place:

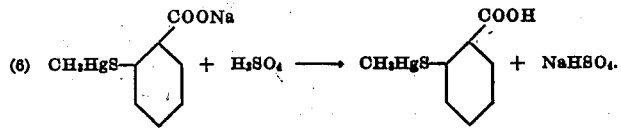

The methyl mercuri-thiosalicylic acid thus formed precipitates, is separated by filtration, and is dissolved in a water solution of sodium hydroxide or sodium bicarbonate as before, to produce a solution of the sodium salt suitable for injection.

*Example 3.*

Instead of starting with the methyl mercuric chloride of Examples 1 and 2, one may start with other methyl mercuric compounds, such for instance as methyl mercuric hydroxide. If that is treated with thiosalicylic acid, conveniently in alcohol as a condensing medium, the following reaction takes place:

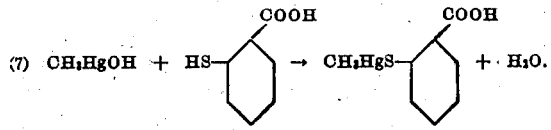

The methyl mercuri-thiosalicylic acid formed may be purified and a water-soluble salt obtained therefrom, in the manner outlined in Example 1.

The foregoing examples will suggest various other modifications of the same general method to a person skilled in the art.

In the foregoing three examples, it is contemplated that the thiosalicylic acid will be in alcohol solution; and I deem that preferable. However, if an excess of sodium hydroxide is used, the thiosalicylic acid may be added either in solid form or in water suspension to an alkaline water solution of the methyl mercuric chloride. The reaction then takes place, as shown by equation 5 then takes place, to form the sodium salt of the methyl mercuri-thiosalicylic acid. This may be isolated and purified as in Example 2.

The same processes may be used with different initial alkyl mercuric compounds, such for instance as the ethyl mercuric, propyl mercuric, butyl mercuric, amyl mercuric, or allyl mercuric salts or hydroxides, or their isomers; and with various thio acids such as those named earlier, including not only the thiosalicylic acid given in the above examples but also (among others) thioglycollic acid, p-sulfhydryl phenyl acetic acid, p-sulfhydrylbenzene sulfonic acid, β sulfhydryl propionic acid, α sulfhydryl butyric acid, and cysteine. I shall not attempt to enumerate all the different acids and salts thus obtainable by different pairings of such initial compounds, as that will be evident from what has been said.

Generally speaking, the mercuri-thio acids obtained are water-soluble when the acid group is of the sulfonic series, and usually water-insoluble when the acid group is of the carboxylic series; but the sodium, potassium, ammonium, and salts of said mercuri-thio acids are water-soluble in all instances.

In all the examples given using carboxylic thio acids, the thio acids used as illustrations were ortho acids, with the sulfhydryl group and the carboxylic group joined to adjacent carbon atoms of the benzene ring. However, this was merely illustrative, as the analogous meta acids and para acids may be used equally well.

Similarly, in the various other aromatic acids named, the sulfhydryl group and the acidic group may be in either the ortho, meta, or para relation. This is so both with the carboxylic acids and the sulfonic acids.

While in many cases it is desirable to prevent the formation in the final result of any free by-product-acid, as by having a hydroxyl group for Y or by conducting the reaction throughout in the presence of free hydroxyl ions, in certain cases the condensation may be effected without the presence of any base as a condensing agent. For example, one may take a solution or suspension of 0.1 mole of ethyl mercuric chloride ($C_2H_5HgCl$) in alcohol and treat it directly with a solution or suspension of p-sulfhydryl benzene sulfonic acid in alcohol. A white precipitate separates on short standing, which is the condensation product. The reaction takes place in the following manner:

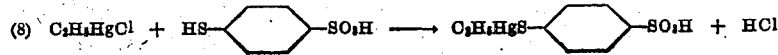

The ethyl mercuri-p-sulfobenzene sulfonic acid thus formed as the white precipitate is separated by filtration, and may be dissolved in a water solution of sodium hydroxide or sodium bicarbonate as before, to produce a solution of the sodium salt suitable for injection.

Ethyl mercuri-p-sulfobenzene sulfonic acid

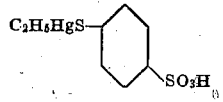

is a white solid, and has no melting point up to about 300° C. It is soluble in water and dilute hydrochloric acid. It is insoluble in alcohol and ether. It forms water-soluble salts with the alkali metals, such as sodium and potassium, with ammonia, and with some (probably all) alkyl-amines; and water-insoluble salts with the alkaline earth metals, such as calcium.

I give below a few examples of mercuri-thio acids which have been produced by obvious modifications of the processes outlined in Examples 1, 2, and 3:

Ethyl mercuri-thiosalicylic acid

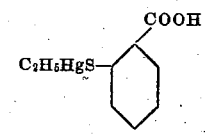

is a white solid which melts at about 110° C. It is insoluble in water and dilute hydrochloric acid. It is soluble in alcohol and ether. It forms water-soluble salts with the alkali metals, such as sodium and potassium, with ammonia, and with some (probably all) alkyl-amines; and water-insoluble salts with the alkaline earth metals, such as calcium.

Ethyl mercuri-m-sulfobenzoic acid

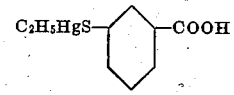

is a white solid which melts at about 105° C. It is insoluble in water and dilute hydrochloric acid. It is soluble in alcohol and ether. It forms water-soluble salts with the alkali metals, such as sodium and potassium, with ammonia, and with some (probably all) alkyl-amines; and water-insoluble salts with the alkaline earth metals, such as calcium.

Isoamyl mercuri—β—sulfopropionic acid

is a white solid which reddens at about 160° C., blackens at about 210° C., and melts with decomposition at about 215° C. It is insoluble in water and dilute hydrochloric acid. It is soluble in alcohol and ether. It forms water-soluble salts with the alkali metals, such as sodium and potassium, with ammonia, and with some (probably all) alkyl amines; and water-insoluble salts with the alkaline earth metals, such as calcium.

Isoamyl mercuri-cysteine hydrochloride

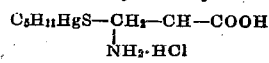

is a white solid which melts at about 95° C. It is insoluble in water and dilute hydrochloric acid. It is insoluble in alcohol and ether. It forms water-soluble salts with the alkali metals, such as sodium and potassium, with ammonia, and with some (probably all) alkyl-amines; and water-insoluble salts with the alkaline earth metals, such as calcium.

Allyl mercuri-cysteine hydrochloride

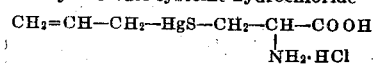

is a white solid which melts at about 93° C. with decomposition. It is slightly soluble in water and dilute hydrochloric acid. It is soluble in alcohol and ether. It forms water-soluble salts with the alkali metals, such as sodium and potassium; and water-insoluble salts with the alkaline earth metals, such as calcium.

Methyl mercuri —α— sulfobutyric acid

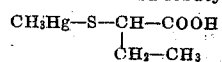

is a white solid which melts at about 73° C. It is soluble in water, dilute hydrochloric acid, alcohol, and ether. It forms water-soluble salts with the alkali metals, such as sodium and potassium, with ammonia, and with some (probably all) alkyl-amines; and water-insoluble salts with the alkaline earth metals, such as calcium.

Allyl mercuri-p-sulfobenzene sulfonic acid

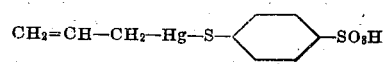

is a white solid, and has no melting point up to about 300° C. It is soluble in water and dilute hydrochloric acid. It is insoluble in alcohol and ether. It forms water-soluble salts with the alkali metals, such as sodium and potassium; and water-insoluble salts with the alkaline earth metals, such as calcium.

Methyl mercuri-thioglycollic acid

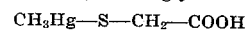

is a white solid which melts at about 87° C. It is soluble in water, dilute hydrochloric acid, alcohol, and ether. It forms water-soluble salts with the alkali metals, such as sodium and potassium, with ammonia, and with some (probably all) alkyl-amines. If this acid is crystallized from alcoholic solution, it separates in beautiful glistening white needles.

Ethyl mercuri-thioglycollic acid

is a white solid which melts at about 79° C.

It is soluble in water, dilute hydrochloric acid, alcohol, and ether. It forms water-soluble salts with the alkali metals, such as sodium and potassium, with ammonia, and with some (probably all) alkyl-amines.

Propyl mercuri-thioglycollic acid $C_3H_7Hg—S—CH_2—COOH$ is a white solid which melts at about 73° C. It is soluble in water, dilute hydrochloric acid, alcohol, and ether. It forms water-soluble salts with the alkali metals, such as sodium and potassium, with ammonia, and with some (probably all) alkyl-amines.

n-butyl mercuri-thioglycollic acid $C_4H_9Hg—S—CH_2—COOH$ is a white solid which melts at about 68° C. It is soluble in water, dilute hydrochloric acid, alcohol, and ether. It forms water-soluble salts with the alkali metals, such as sodium and potassium, with ammonia, and with some (probably all) alkyl-amines.

In addition to the above compounds whose physical constants are listed, the following compounds, as indicated by their decreased toxicity over the initial alkyl mercuric salts and by the solubility of their alkali-metal salts in water, have been prepared, and without further chemical assay have proved on test to be effective as germicides:

Ethyl mercuri—β—sulfopropionic acid.

$C_2H_5HgS—CH_2CH_2—COOH$ n-butyl mercuri—α—sulfopropionic acid.

$C_4H_9Hg—S—CH_2—CH_2—COOH$

Ethyl mercuri—α—sulfobutyric acid.

$C_2H_5Hg—S—CH—COOH$
$\qquad\qquad\quad |$
$\qquad\qquad\; CH_2—CH_3$ n-butyl mercuri—α—sulfobutyric acid.

$C_4H_9Hg—S—CH—COOH$
$\qquad\qquad\quad |$
$\qquad\qquad\; CH_2CH_3$

Ethyl mercuri-cysteine hydrochloride.

$C_2H_5Hg—S—CH_2—CH—COOH$
$\qquad\qquad\qquad\qquad |$
$\qquad\qquad\qquad\; NH_2·HCl$ n-butyl mercuri-cysteine hydrochloride.

$C_4H_9Hg—S—CH_2—CH—COOH$
$\qquad\qquad\qquad\qquad |$
$\qquad\qquad\qquad\; NH_2·HCl$ Ethyl mercuri-sulfosuccinic acid.

$C_2H_5Hg—S—CH—COOH$
$\qquad\qquad\quad |$
$\qquad\qquad\; CH_2—COOH$ n-butyl mercuri-thiosalicylic acid.

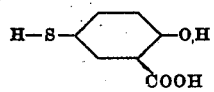

Ethyl mercuri-m-sulfobenzoic acid.

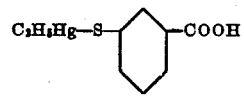

Butyl mercuri-m-sulfobenzoic acid.

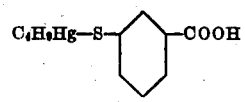

Ethyl mercuri-p-sulfobenzoic acid.

$C_2H_5Hg—S—\langle\;\rangle—COOH$

Butyl mercuri-p-sulfobenzoic acid.

$C_4H_9Hg—S—\langle\;\rangle—COOH$

Isoamyl mercuri-p-sulfobenzoic acid.

$C_5H_{11}Hg—S—\langle\;\rangle—COOH$

Ethyl mercuri-p-sulfophenyl acetic acid.

$C_2H_5Hg—S—\langle\;\rangle—CH_2COOH$

Methyl mercuri-p-sulfobenzene sulfonic acid.

$CH_3Hg—S—\langle\;\rangle—SO_3H$

Allyl mercuri-thiosalicylic acid.

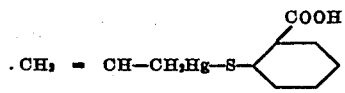

Ethyl mercuri-p-sulfosalicylic acid.

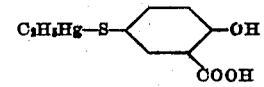

n-butyl mercuri-p-sulfosalicylic acid.

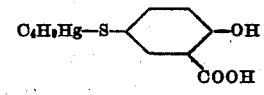

(In preparing most of the substances just named, initial sulf-hydryl organic compounds are used that are known and available. However, in preparing the last two of the list, an initial sulf-hydryl organic compound is used that I believe is in itself new. It is p-sulfhydryl salicylic acid $H—S—\langle\;\rangle—O_2H$
$\qquad\qquad |$
$\qquad\quad\; COOH$ It is prepared by diazotizing amino salicylic acid in the regular manner. The diazo compound is then neutralized with sodium bicarbonate, and the requisite amount of potassium xanthate added. The solution is boiled with alkali to hydrolyze the xanthate addition product, and the sulfide recovered by acidification and filtration.

The sulfide is then reduced with sodium carbonate and zinc in water. The sulfhydryl acid is recovered by acidification, filtration, and drying in vacuo.)

As already indicated, the alkali-metal salts of these various acids are all water-soluble. The sodium salts are well-suited for intravenous injection. These water-soluble salts are effective therapeutically as germicides.

I claim as my invention:—

1. A step in the method of producing water-soluble compounds of alkyl mercuric compounds, which comprises treating, in a suitable solvent, a mercuric compound in which one valence bond of the mercury is attached to a radical of other than the sulphur family and the other valence bond of the mercury is directly attached to a carbon atom of an alkyl radical, with an organic compound containing both an acid radical and a sulfhydryl group and having the sulfhydryl group directly attached to a carbon atom.

2. The step in the method of producing water-soluble compounds of alkyl mercuric compounds, which comprises treating, in a suitable solvent, a mercuric compound in which one valence bond of the mercury is attached to a radical of other than the sulphur family and the other valence bond of the mercury is directly attached to a carbon atom of an alkyl radical of the paraffin series, with an organic compound containing both an acid radical and a sulfhydryl group and having the sulfhydryl group directly attached to a carbon atom.

3. The step in the method of producing water-soluble compounds of alkyl mercuric compounds, which comprises treating, in a suitable solvent, a mercuric compound in which one valence bond of the mercury is attached to a radical of other than the sulphur family and the other valence bond of the mercury is directly attached to a carbon atom of an alkyl radical having not to exceed three carbon atoms, with an organic compound containing both an acid radical and a sulfhydryl group and having the sulfhydryl group directly attached to a carbon atom.

4. The step in the method of producing water-soluble compounds of alkyl mercuric compounds, which comprises treating, in alcohol as a condensing medium, a mercuric compound in which one valence bond of the mercury is attached to a radical of other than the sulphur family and the other valence bond of the mercury is directly attached to a carbon atom of an alkyl radical having not to exceed three carbon atoms, with an organic compound containing both an acid radical and a sulfhydryl group and having the sulfhydryl group directly attached to a carbon atom.

5. The step in the method of producing water-soluble compounds of alkyl mercuric compounds, which comprises treating, in alcohol as a condensing medium, a mercuric compound in which one valence bond of the mercury is attached to a radical of other than the sulphur family and the other valence bond of the mercury is directly attached to a carbon atom of an alkyl radical, with an organic compound containing both an acid radical and a sulfhydryl group and having the sulfhydryl group directly attached to a carbon atom.

6. The step in the method of producing water-soluble compounds of alkyl mercuric compounds, which comprises treating, in a suitable solvent, an alkyl mercuric salt in which one valence bond of the mercury is attached to a radical of other than the sulphur family and the other valence bond of the mercury is directly attached to a carbon atom of the alkyl group, with a sulfhydryl organic acid in which a sulfhydryl group is directly attached to a carbon atom, in the presence of a substance which neutralizes the by-product acid formed by the direct reaction.

7. The step in the method of producing water-soluble compounds of alkyl mercuric compounds, which comprises treating, in a suitable solvent, an alkyl mercuric salt in which one valence bond of the mercury is attached to a radical of other than the sulphur family and the other valence bond of the mercury is directly attached to a carbon atom of the alkyl group, with an organic compound containing both an acid radical and a sulfhydryl group and having the sulfhydryl group directly attached to a carbon atom, in the presence of a substance which neutralizes acid formed in the reaction.

8. The step in the method of producing water-soluble compounds of alkyl mercuric compounds, which comprises treating, in a suitable solvent, an alkyl mercuric compound having one valence bond of the mercury attached to a radical of other than the sulphur family, with an organic compound containing both an acid radical and a sulfhydryl group and having the sulfhydryl group directly attached to a carbon atom, and including a monovalent base in the reaction.

9. An alkyl mercuric compound, in which one bond of a mercury atom is attached to a carbon atom of an alkyl radical, the other bond of the mercury atom is attached to one bond of a sulphur atom, and the other bond of the sulphur atom is attached to a carbon atom of an organic radical containing an acid group which has a valence bond capable of being attached either to hydrogen or to a metal.

10. An alkyl mercuric compound, in which one bond of a mercury atom is attached to a carbon atom of an alkyl radical, the other bond of the mercury atom is attached to one bond of a sulphur atom, and the other bond of the sulphur atom is attached to a carbon atom of an aromatic radical containing an acid group which has a valence bond capable of being attached either to hydrogen or to a metal.

11. An alkyl mercuric compound, in which one bond of a mercury atom is attached to a carbon atom of an alkyl radical of the paraffin series, the other bond of the mercury atom is attached to one bond of a sulphur atom, and the other bond of the sulphur atom is attached to a carbon atom of an organic radical containing an acid group which has a valence bond capable of being attached either to hydrogen or to a metal.

12. An alkyl mercuric compound, in which one bond of a mercury atom is attached to a carbon atom of an alkyl radical having not to exceed three carbon atoms, the other bond of the mercury atom is attached to one bond of a sulphur atom, and the other bond of the sulphur atom is attached to a carbon atom of an organic radical containing an acid group which has a valence bond capable of being attached either to hydrogen or to a metal.

13. An alkyl mercuric compound, in which one bond of a mercury atom is attached to a carbon atom of an alkyl radical of the paraffin series, the other bond of the mercury atom is attached to one bond of a sulphur atom, and the other bond of the sulphur atom is attached to a carbon atom of an aromatic radical containing an acid group which has a valence bond capable of being attached either to hydrogen or to a metal.

14. An alkyl mercuric compound, in which one bond of a mercury atom is attached to a carbon atom of an alkyl radical having not to exceed three carbon atoms, the other bond of the mercury atom is attached to one bond of a sulphur atom, and the other bond of the sulphur atom is attached to a carbon atom of an aromatic radical containing an acid group which has a valence bond capable of being attached either to hydrogen or to a metal.

15. A water-soluble alkyl mercuric salt, in which one bond of a mercury atom is attached to a carbon atom of an alkyl radical, the other bond of the mercury atom is attached to one bond of a sulphur atom, and the other bond of the sulphur atom is attached to a carbon atom of an organic radical containing an acid group which has a valence bond attached to an alkali metal.

16. A water-soluble alkyl mercuric salt, in which one bond of a mercury atom is attached to a carbon atom of an alkyl radical, the other bond of the mercury atom is attached to one bond of a sulphur atom, and the other bond of the sulphur atom is attached to a carbon atom of an aromatic radical containing an acid group which has a valence bond attached to an alkali metal.

17. A water-soluble alkyl mercuric salt, in which one bond of a mercury atom is attached to a carbon atom of an alkyl radical of the paraffin series, the other bond of the mercury atom is attached to one bond of a sulphur atom, and the other bond of the sulphur atom is attached to a carbon atom of an organic radical containing an acid group which has a valence bond attached to an alkali metal.

18. A water-soluble alkyl mercuric salt, in which one bond of a mercury atom is attached to a carbon atom of an alkyl radical having not to exceed three carbon atoms, the other bond of the mercury atom is attached to one bond of a sulphur atom, and the other bond of the sulphur atom is attached to a carbon atom of an organic radical containing an acid group which has a valence bond attached to an alkali metal.

19. A water-soluble alkyl mercuric salt, in which one bond of a mercury atom is attached to a carbon atom of an alkyl radical of the paraffin series, the other bond of the mercury atom is attached to one bond of a sulphur atom, and the other bond of the sulphur atom is attached to a carbon atom of an aromatic radical containing an acid group which has a valence bond attached to an alkali metal.

20. A water-soluble alkyl mercuric salt, in which one bond of a mercury atom is attached to a carbon atom of an alkyl radical having not to exceed three carbon atoms, the other bond of the mercury atom is attached to one bond of a sulphur atom, and the other bond of the sulphur atom is attached to a carbon atom of an aromatic radical containing an acid group which has a valence bond attached to an alkali metal.

In witness whereof, I have hereunto set my hand at Indianapolis, Indiana, this 27th day of June, A. D. one thousand nine hundred and twenty seven.

MORRIS SELIG KHARASCH.